May 6, 1941. L. T. MART Re. 21,794

COOLING TOWER

Original Filed May 9, 1938

INVENTOR.
Leon T. Mart
BY Hoover & Hamilton
ATTORNEYS.

Reissued May 6, 1941

Re. 21,794

UNITED STATES PATENT OFFICE 21,794

COOLING TOWER

Leon T. Mart, Mission Township, Johnson County, Kans., assignor to The Marley Company, Kansas City, Kans., a corporation of Missouri Original No. 2,191,938, dated February 27, 1940, Serial No. 206,771, May 9, 1938. Application for reissue June 3, 1940, Serial No. 338,655

6 Claims. (Cl. 261—111)

This invention relates to cooling towers and has for its object to produce an induced draft tower in which the air is drawn into the tower and progressively increases in velocity through the tower until it is discharged upwardly at its maximum speed. With this arrangement the pumping head may be reduced as it is found that the overall height of the tower may be less than with forced draft towers where vertical height must be wasted in the formation of a plenum chamber and in attaining the necessary vertical drop for water distribution.

A further object of the invention is to produce a tower of this character in which the air is so guided or directed that the entire cross sectional area of the equipment performs useful work, with the result that a fan of less power secures efficient cooling of the water. By a tower of this construction, even though it is of low height, the air enters at its lowest speed and exits at its greatest speed, and is forcibly discharged so that it can not circulate back through the tower as now frequently occurs in forced draft towers, where the air enters at high speed and exits at low speed.

A further object of the invention is to produce a construction in which the horizontal flow of the cooling air at relatively low velocity, avoids the drift of concentration of the water, which interferes with cooling efficiency in forced draft types where horizontal air flow is maintained.

Another object of the invention is to produce a cooling structure in which the air passes horizontally through water that is gravitating downwardly in finely comminuted form, and particularly in that class of equipment in which the water cooling chamber is filled with a series of vertically spaced splash or trickle decks, and the air is divided into a multiplicity of streams or currents between each of the decks. Heretofore, this type of equipment has not proven entirely satisfactory due to the fact that the water tends to drift or pile up toward the side of the cooling chamber in which the air is travelling with the result that the efficiency is lowered to a considerable degree and the air tends to travel in diagonal lines to the fan and create areas of local or eddy circulation.

A further object of the invention is to produce an air guiding means so formed and disposed that creation of eddy or local currents due to the interference of one horizontal stream with another, is entirely avoided, the result being that the overall efficiency of the equipment is greatly increased.

A still further object of the invention is to produce induced draft cooling equipment involving a cooling chamber and a discharge or drift deposition chamber, said cooling chamber having vertically spaced splash decks of equal area from bottom to top of the cooling chamber in its preferred embodiment, and the top of the discharge chamber having a fan for inducing horizontal air flow between the cooling tower decks, together with water eliminating and air baffle means tending to equalize the flow throughout the height of the cooling chamber and avoid eddies in the discharge chamber.

With the general objects named in view and others as will hereinafter appear, the invention consists in certain novel and useful features of construction and organization of parts as hereinafter described and claimed; and in order that it may be fully understood, reference is to be had to the accompanying drawing, in which:

Figure 1:
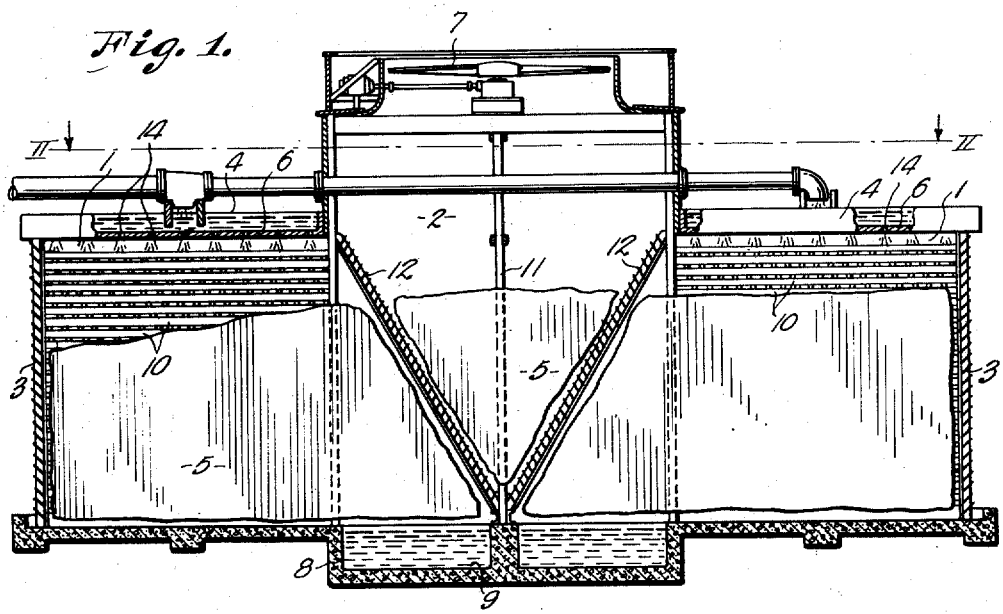
Figure 1 is a cross section through a cooling tower embodying the invention.
Figure 2:
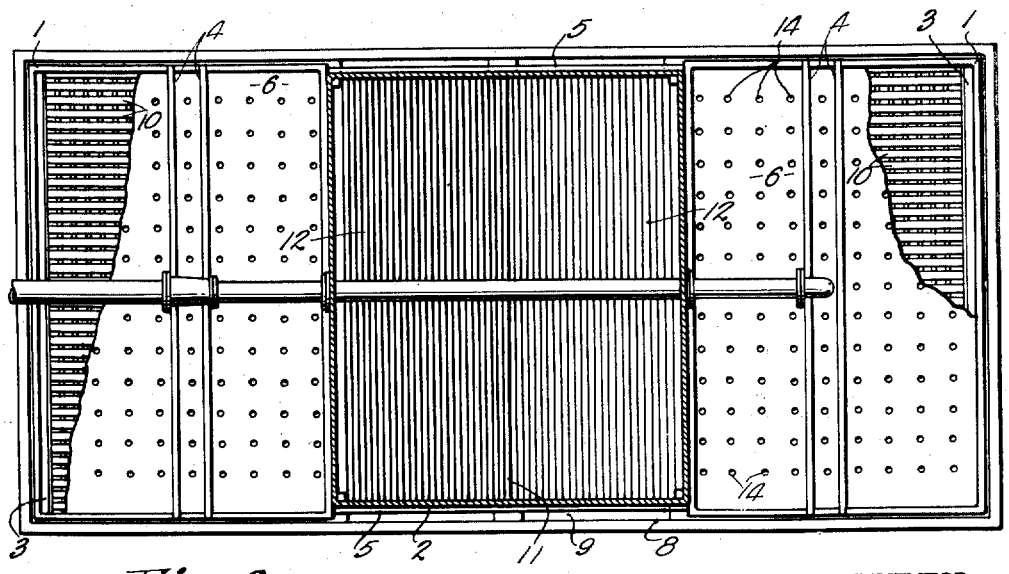
Figure 2 is a section on the line II—II of Figure 1.

In the said drawing, where like reference characters identify corresponding parts in all of the figures, the invention essentially comprises a cooling tower having a water cooling chamber or casing 1, and a discharge or drift deposition chamber or casing 2, the cooling chamber having in one of its side walls, an air entry opening directly opposite the point of communication between the discharge and cooling chambers. The cooling air entry opening extends for the full width and height of the tower and is preferably provided with the louvers 3, and is provided with any suitable means at its upper end for the distribution of water, such as the trough members 4.

The ends and top of the cooling chamber 1 are closed as by end walls 5 and a perforated top covering 6 to prevent the entry of air except through the louvered opening 3. By thus confining air entry to one opening the full height and width of the cooling chamber, a horizontal air flow through said chamber as induced by the fan 7 at the upper end of the discharge casing, is secured. By preference, the fan 7 is mounted within an annular flaring metal shield which has been found to so guide the air into the fan that practically the entire length of the fan blades are preforming useful work when the fan is in operation. The bottom 8 of the cooling chamber is a collecting basin from which water flows to a central collecting basin 9 below the discharge chamber 2.

End walls 5 are in parallel relation so that as air passes from louvered opening 3, horizontally toward chamber 5, no compression occurs and therefore, no massing of water. The cross sectional area of all horizontal passages through water cooling chamber 1 is constant and any increase in speed of air is not accompanied by reassemblying of water previously introduced through spray nozzles 14 depending from each perforation of top covering 6 respectively.

In the preferred embodiment of the invention, the cooling chamber 1 is filled with a plurality of vertically spaced decks 10, the splashing or trickling of the water from deck-to-deck keeping it in finely divided form for better heat transfer contact with the cooling air. It will also be noted that in the structure shown in the drawing, the cooling chambers 1 are built in duplicate on opposite sides of the fan-equipped discharge chamber 2, divided into two sections by a partition 11 to avoid conflict between the opposite moving air currents, but, of course, this arrangement is optional and depends upon the volume to be handled and the area available for the installation of the tower.

With a construction of the general character outlined, it will be found that without means to guide and direct the air currents flowing horizontally through the cooling chambers 1, as induced by the fan 7, the turbulence created by the fan will tend to set up local or eddy currents within the lower part of the discharge casing, and in addition thereto the air tends to take the shortest path to the fan, which results in a more or less diagonally upward travel of air from the righthand lower corner to the upper lefthand corner of the cooling chamber shown to the right in Figure 1. As a result, the water gravitating in said chamber for a substantial part of its travel is subjected only to the effect of local or eddy currents which will whirl around and around in the lower lefthand portion of the cooling chamber. Such a tower, therefore, is inefficient and the expense of fan operation under some conditions becomes commercially impracticable.

It has further been found that even if the air is retained or confined to more or less independent horizontal paths through the cooling chamber 1, as soon as it enters the discharge chamber 2, it tends to travel diagonally upward on the shortest path to the fan. Thus, the center or lower lefthand portion of the discharge chamber is a non-working area in which local or eddy currents are free to circulate and lower the efficiency of the installation by interfering with the free travel of air to the exhaust fan.

My object, therefore, is to overcome the above defects by providing air guiding or baffle elements which may be such as the inclined louvers 12, with the result that the air currents travelling through the cooling chamber move in horizontal parallel paths, and will continue their horizontal travel until they strike the guiding means 12 by which they are turned to travel vertically upwardly, at an increased speed if the cross sectional area of the discharge chamber is less than that of the cooling chamber. With this arrangement the tendency of the air to travel the shortest path is overcome, resulting in more effective utilization of the air in the cooling chamber as well as the more even distribution of the air throughout the discharge chamber, so that there are no voids or blank spots for eddy currents.

Baffle elements 12 serve as water separators and have effective areas greater than the cross sectional area of the adjacent inner open sides of water cooling chambers 1. Baffles 12 are inclined and spaced from the inner open sides of chambers 1 to allow horizontally flowing air to lose relatively heavy particles of water prior to striking baffles 12 where deposition of any remaining entrained water will occur.

From the above description, it will be apparent that I have produced a construction embodying all of the features of advantage set forth as desirable, and while I have described and illustrated the preferred embodiment, it is to be understood that I reserve the right to all changes within the spirit of the invention and without the ambit of the prior art.

I claim:

1. In heat exchange apparatus, a cooling tower comprising a casing formed with a central discharge chamber and a pair of cooling chambers at diametrically opposite sides of the discharge chamber, a plurality of vertically spaced cooling decks in each cooling chamber, all of said decks being of equal area, the sides of said casings forming the cooling chambers being provided with air entry openings opposite their connection with the discharge chamber, an upwardly discharging fan at the upper end of the air discharge chamber, an imperforate partition dividing the discharge chamber into two equal sections at right angles to the cooling chambers, said partition being continuous for the full height of the cooling chambers, baffle means, including a plurality of spaced louvers, in each discharge chamber section to separate water from, and to equalize the flow of air horizontally and in substantially uniform volume in parallel streams across the entire deck areas between adjacent pairs of decks, and means for discharging water onto each of the uppermost decks for downward trickle from deck to deck.

2. In heat exchange apparatus, a cooling tower comprising a casing formed with a central discharge chamber and a plurality of cooling chambers, each cooling chamber communicating at one end with the central chamber, the opposite end of each cooling chamber communicating directly with the exterior of the cooling tower, the top, bottom and sides of each cooling chamber being closed to form a horizontal air guiding conduit, a partition dividing the discharge chamber into independent sections corresponding in number to the number of cooling chambers to prevent horizontal cross draft from one cooling chamber through another, baffle means, including a plurality of spaced louvers, in each discharge chamber section intercepting the air flowing through such section to equalize the flow of air horizontally and in substantially uniform volume in parallel streams across the entire cross sectional areas of their respective cooling chambers and to effect deposition of water entrained by said air, an upwardly discharging fan at the upper end of the discharge chamber, and water distributing means for discharging water at the top of each cooling chamber for gravitating downwardly therethrough.

3. In heat exchange apparatus, a cooling tower comprising a casing formed with a central discharge chamber and a pair of cooling chambers at diametrically opposite sides of the discharge chamber, a plurality of vertically spaced cooling decks in each cooling chamber, the sides of said casings forming the cooling chambers being provided with air entry openings opposite their connection with the discharge chamber and coextensive with the height and width of said decks, a partition dividing the discharge chamber into a pair of independent sections, each section communicating with a cooling chamber, baffle means, including a plurality of spaced louvers, in each discharge chamber section to equalize the flow of air horizontally and in substantially uniform volume in parallel streams across the entire deck areas between adjacent pairs of decks and to effect deposition of water entrained by said air, an upwardly discharging fan at the upper end of the discharge chamber, and water distributing means for discharging water at the top of each cooling chamber for gravitating downwardly therethrough.

4. In heat exchange apparatus, a cooling tower comprising a case formed with a discharge chamber, a cooling chamber formed by the case in direct connection with the discharge chamber at one vertical side thereof and having the opposite vertical side open to the atmosphere, a plurality of vertically spaced horizontal decks in the cooling chamber, closed parallel walls along the ends of the cooling chamber, whereby a horizontal air passage of uniform cross sectional area is presented from the vertical open side to the discharge chamber, baffle means in the discharge chamber in the path of travel of air entering the said chamber from the cooling chamber for equalizing the flow of and separating water from the air, an outwardly discharging fan in the discharge chamber, and water distributing means for discharging water at the top of the cooling chamber for gravitating downwardly therethrough, said baffle means, including spaced louvers and being disposed at an angle across the end of the cooling chamber in spaced relation with the decks therein to set off a space wherein entrained water may drop by gravity from the horizontally moving air after leaving the cooling chamber and prior to its engagement with the baffle means.

5. In heat exchange apparatus, a cooling tower comprising a case formed with a discharge chamber, a cooling chamber formed by the case in direct connection with the discharge chamber at one vertical side thereof and having the opposite vertical side open to the atmosphere, a plurality of vertically spaced horizontal decks in the cooling chamber, dividing the entire chamber into a series of horizontal passages extending from the open side of the cooling chamber to the plane of connection with the discharge chamber, inclined baffle means in the discharge chamber intersecting the extended planes of all of the horizontal passages, means for discharging water at the top of said cooling chamber for gravitation downwardly therethrough and an upwardly and outwardly discharging fan in the discharge chamber for drawing air therefrom, said baffle means extending across the discharge chamber, and downwardly and outwardly from the top of the inner open side of the cooling chamber, beneath the fan to present a space below the baffle in the discharge chamber for the free passage of air as it enters the discharge chamber from the cooling chamber, said baffle means including a plurality of spaced louvers for removing entrained water from and equalizing the flow of the air.

6. In heat exchange apparatus, a cooling tower comprising a case formed with a central discharge chamber and a pair of cooling chambers at diametrically opposite sides of the discharge chamber, a plurality of vertically spaced cooling decks in each cooling chamber, the sides of said casings forming the cooling chambers being provided with air entry openings opposite their connections with the discharge chamber and coextensive with the height and width of said decks, an upwardly discharging fan at the upper end of the discharge chamber, means for discharging water at the top of said cooling chambers for gravitation downwardly therethrough and baffle means comprising spaced louvers in the discharge chamber below the fan and extending entirely across the discharge chamber in spaced relation to each cooling chamber respectively to intersect air currents passing from the cooling chambers, said baffle means extending downwardly and inwardly toward each other from points at the tops of the cooling chambers, the lower edges of the baffle means being in juxtaposition at the bottom of the discharge chamber and on the extended axis of the fan.

LEON T. MART.